March 31, 1931. W. C. CARPENTER 1,799,087
CUTTER
Filed Aug. 21, 1929
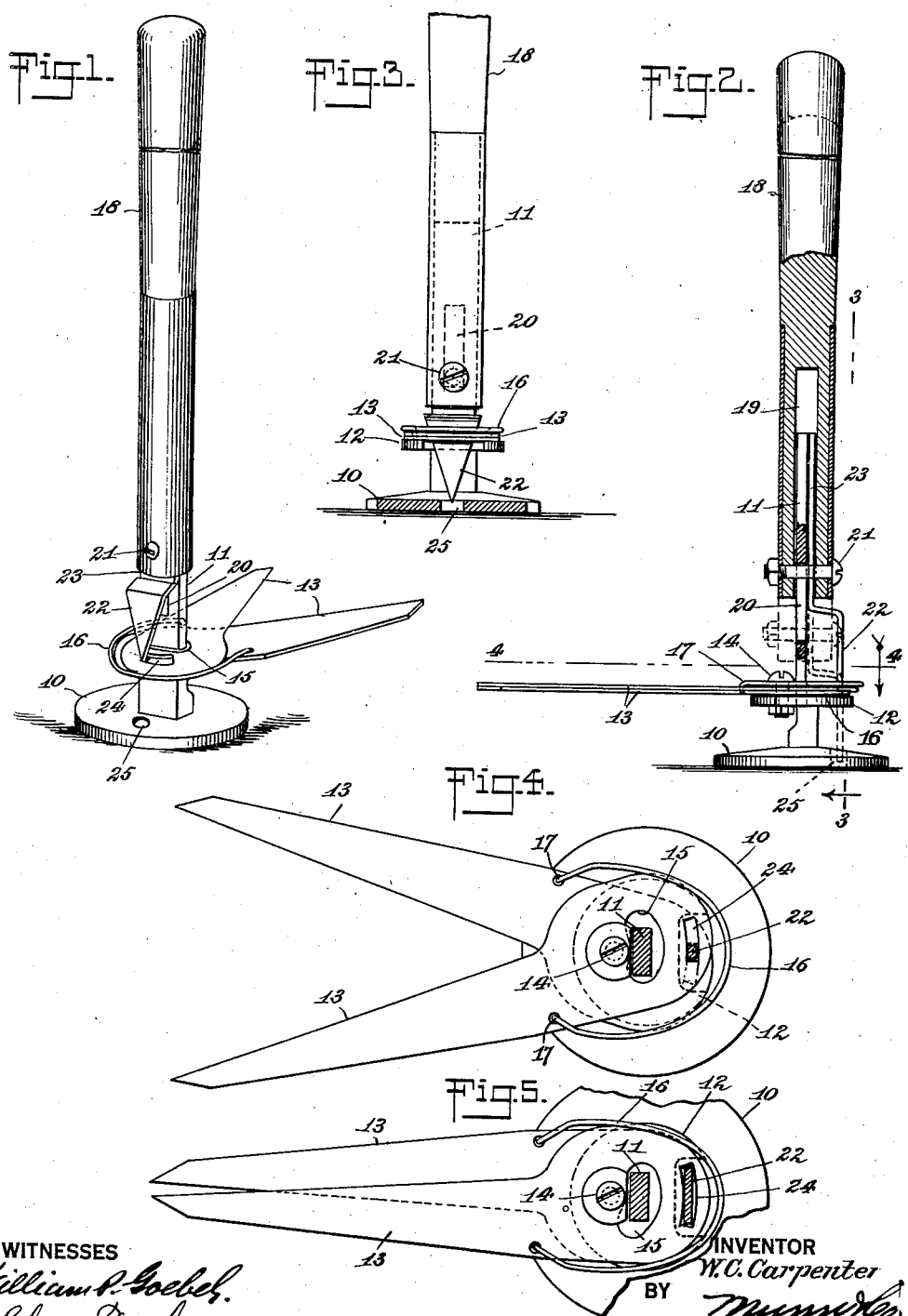
WITNESSES
INVENTOR
W. C. Carpenter
BY
ATTORNEYS Patented Mar. 31, 1931

1,799,087

UNITED STATES PATENT OFFICE

WILLARD C. CARPENTER, OF HENNIKER, NEW HAMPSHIRE

CUTTER

Application filed August 21, 1929. Serial No. 387,482.

This invention relates to a cutter which is useful for cutting grass and weeds, and other obvious uses.

The principal object of the invention is the provision of a simple and practical cutter designed and adapted to enable the user to assume an easy position while operating the cutter, to the end that the work of cutting, such as the work of cutting grass, may be performed in a less arduous manner.

With the foregoing and other objects in view the invention resides in the particular combination, construction and operation of the parts hereinafter fully described and illustrated in the accompanying drawing, in which—

Figure 1 is a perspective view of the cutter embodying the features of the present invention.

Fig. 2 is a side view of the cutter, the same being shown partly in section.

Fig. 3 is a section taken on the line 3—3 of Fig. 2.

Fig. 4 is an enlarged section taken on the line 4—4 of Fig. 2.

Fig. 5 is a view similar to Fig. 4 but showing the cutting blades closed.

Referring now more particularly to the several views of the drawing, it will be apparent that the cutter includes a base 10 of suitable size and weight to hold the cutter in operative position. A vertical standard or post 11 is positioned on the base 10 centrally thereof. A circular plate 12 is secured to the post 11 and is disposed horizontally with respect thereto. A pair of similar cutting blades 13 are employed to cooperate with each other to produce a cutting or shearing action when caused to move relatively to each other. These blades 13 are mounted on the plate 12 to turn on a vertical axis presented by the pivot bolt 14 carried by the plate 12 at one side of the post 11. Each blade 13 has an arcuate opening 15 therein to accommodate the post 11, and also to allow the blade to move the necessary degree. The blades 13 are under the influence of a yieldable means in the form of a spring 16 having the opposite ends thereof respectively connected as at 17 with the blades 13. This spring 16 is of U-shape, and has a normal tendency to urge the blades 13 to the open relation, as shown most clearly in Fig. 4.

In order to operate the blades 13, there is provided means presently to be described, which cooperates with the spring 16 to produce the sharing or cutting action of the blades by alternately opening and closing the same. The said means includes a handle 18 which may be of any preferred length. The lower end of the handle 18 is hollow, or in other words has a bore 19 in the lower end thereof. This bore receives the upper end of the post 11. The post 11 has a slot 20 therein through which a bolt 21 carried by the lower end of the handle extends. In this manner the handle 18 will be disposed upright and be mounted for guided up and down movement. Use is made of a substantially triangular cam 22 having an offset extension 23. The extension 23 is disposed in the bore 19 in the handle, and the bolt 21 extends through said extension 23. It will therefore be understood that the cam 22 moves with the handle 18. The butts of the blades 13 have an arrangement of arcuate cam slots 24, in which the cam 22 operates. The cam 22 moves in a notch in the plate 12. The base 10 has an opening 25 therein to accommodate the point of the cam 22.

The cutter operates as follows: when the handle 18 is in the up position, the blades 13 will be in the opened relationship. By exerting a downward pressure on the handle 18 the cam 22 being forced downwardly will co-act with two end walls respectively of the slots 24, causing the blades 13 to move to the closed or cutting relationship. The handle after reaching the downward limit of its movement, by the engagement of the bolt 22 with the lower end wall of the slot 20, is pulled upwardly. During the upward movement of the handle 18, the spring 16, which is constantly acting on the blades 13, causes them to move to the opened relationship. By continuing the down and up movement, or reciprocation of the handle 18, the blades 13 will be kept in motion relatively to each other, to produce the cutting or shearing action. It is to be understood that the cutter will be advanced over the ground in order to cut the grass or weeds by the action of the blades.

From the foregoing it will be obvious that the cutter is one which is designed to enable the user to perform the work of cutting in a less arduous manner, particularly due to the fact that the user may assume a standing or upright position.

I claim:

1. A cutter comprising the combination of a base, relatively movable cutting blades mounted on the base and which are adapted to co-operate with each other to produce a cutting or shearing action when moved relatively to each other, an actuator mounted on said base, for up and down movement, said blades each having a slot therein, a cam movable with said actuator so as to coact with the end walls of said slots to move said blades shearwise in response to the down movement of said actuator, and resilient means connected with said blades to cause them to move non-shearwise.

2. A cutter comprising the combination of a base provided with an upright post having a slot therein, a handle whose lower end is hollow to receive the post for relative movement, a bolt extending transversely of the lower end of the handle and also through the slot in said post to limit the up and down movement of said handle, a horizontal plate on said post, cutting blades pivoted on said plate to coact with each other to produce a shearing action when moved relatively to each other, spring means to cause the blades to move non-shearwise on their pivots, and coacting means on the handle and blades to cause the blades to move shearwise on their pivots in response to the movement of the handle.

3. A cutter comprising the combination of a base provided with an upright post having a slot therein, a handle whose lower end is hollow to receive the post for relative movement, a bolt extending transversely of the lower end of the handle and also through the slot in said post to limit the up and down movement of said handle, a horizontal plate on said post, cutting blades pivoted on said plate to coact with each other to produce a shearing action when moved relatively to each other, spring means to cause the blades to move non-shearwise on their pivots, said blades each having an arcuate slot therein, and a cam carried by said bolt, which coacts with the end walls of said slots to cause said blades to move shearwise on their pivots in response to the downward movement of the handle.

WILLARD C. CARPENTER.